United States Patent [19]

Soules et al.

[11] Patent Number: 5,751,104
[45] Date of Patent: May 12, 1998

[54] COMPACT FLUORESCENT LAMP HAVING A HELICAL LAMP ENVELOPE

[75] Inventors: Thomas F. Soules, Richmond Heights, Ohio; Marton Hraboczki, Budapest, Hungary; John R. Lahl, Parma, Ohio

[73] Assignee: General Electric Company, Schenectady, N.Y.

[21] Appl. No.: 751,031

[22] Filed: Nov. 15, 1996

Related U.S. Application Data

[63] Continuation of Ser. No. 414,077, Mar. 31, 1995, abandoned.

[51] Int. Cl.$^6$ .................. H01J 17/16; H01J 61/30
[52] U.S. Cl. .................. 313/493; 313/610; 313/634
[58] Field of Search .................. 313/493, 634; 315/56; 428/690

[56] References Cited

U.S. PATENT DOCUMENTS

| | | | |
|---|---|---|---|
| 2,205,672 | 6/1940 | Sawyer | 313/493 |
| 2,279,635 | 4/1942 | Morley | 313/493 |
| 2,501,375 | 3/1950 | Breadner et al. | 313/493 |
| 2,778,462 | 4/1957 | MacFarlane | |
| 3,764,844 | 10/1973 | Schmidt | 313/634 |
| 3,886,396 | 5/1975 | Hammer et al. | |
| 3,898,495 | 8/1975 | Livera | |
| 3,899,712 | 8/1975 | Witting | 313/493 |
| 3,953,761 | 4/1976 | Giudice | |
| 4,503,360 | 3/1985 | Bedel | 313/493 |
| 4,694,215 | 9/1987 | Hofmann | |
| 4,797,594 | 1/1989 | Sigai et al. | |
| 5,128,590 | 7/1992 | Holzer | 313/493 |
| 5,150,965 | 9/1992 | Fox | |
| 5,220,236 | 6/1993 | Washburn et al. | |
| 5,243,256 | 9/1993 | Holzer | 313/634 |
| 5,331,168 | 7/1994 | Beaubien et al. | |
| 5,341,068 | 8/1994 | Nerone | |
| 5,361,017 | 11/1994 | Krause | |

FOREIGN PATENT DOCUMENTS

| | | | |
|---|---|---|---|
| 469166 | 11/1950 | Canada | 313/634 |
| 4133077 A1 | 4/1993 | Germany | |
| WO 9429895 | 12/1994 | WIPO | |

*Primary Examiner*—Ashok Patel
*Attorney, Agent, or Firm*—Pearne, Gordon, McCoy & Granger LLP

[57] ABSTRACT

A compact fluorescent lamp is provided having a lamp envelope which is shaped in the form of a double helix. The lamp envelope is formed so as to exhibit a side contour which is essentially hemispherical in shape thereby providing a light distribution which approximates that of a conventional A-line incandescent lamp. The lamp envelope further provides a top portion which tapers inwardly and which has a crossover portion at the top that provides a light distribution from this top region that is essentially uniform across such top portion. The open coiling configuration of the lamp envelope is further effective for allowing light generated from the interior of the coiled lamp envelope, to pass through the open coil arrangement with a minimum amount of loss as can otherwise occur for a straight lamp envelope arrangement.

13 Claims, 3 Drawing Sheets

5,751,104

1

COMPACT FLUORESCENT LAMP HAVING A HELICAL LAMP ENVELOPE

This is a continuation of application Ser. No. 08/414,077, filed Mar. 31, 1995 now abandoned.

FIELD OF THE INVENTION

This invention relates to a compact fluorescent lamp having a lamp envelope which is formed essentially in the shape of a double helix. More particularly, this invention relates to such a compact fluorescent lamp as achieves a large enough discharge path to approximate higher wattage incandescent lamps in lumen output while simultaneously providing that the shape of the lamp also approximates a conventional incandescent A-line lamp so as to achieve a comparable light output distribution.

BACKGROUND OF THE INVENTION

In recent years there has been a tremendous increase in the use of compact fluorescent lamps in place of conventional incandescent lamps. Because of the longer life and the improved energy efficiency of the compact fluorescent lamp over that of the conventional incandescent lamp, consumers as well as commercial establishments have been willing to convert to the compact fluorescent lamps. An example of such a compact fluorescent lamp can be found in U.S. Pat. No. 4,503,360 issued to D. E. Bedel on Mar. 5, 1985. It will be noted that for the typical compact fluorescent lamp, the lamp envelope is shaped in a manner whereby a plurality of parallel extending tube portions extend from a base portion for a predetermined length. In order to compare favorably to the incandescent lamps, one area that must be addressed by lamp designers is the ability to achieve higher lumen output levels than are presently achieved; for instance, it would be desirable to provide a compact fluorescent lamp that would achieve substantially the same lumen output as a 100 Watt incandescent lamp. A compact fluorescent lamp of sufficiently high power to give the lumen output of a 100 Watt or higher incandescent lamp while running at currents low enough to be very efficient requires a relatively long arc length of greater than approximately 60 cm. To provide a glass tube with such a length that would fit within the small overall size of the conventional incandescent lamp of the same lumen output, lamp manufacturers have gone to extending the lengths of the respective tube portions of the lamp envelope or, in the alternative, to increasing the number of such tube portions to as many as eight such tube portions. As an example of such an application, some compact fluorescent lamps are produced by bending segments of 12 mm tubing into U-shapes and sealing off one or both legs and then connecting two or more of such bent tubes with glass bridges made by simultaneously blowing out a small hole near the bottom of two tubes and fusing them together. The discharge length then passes up one leg, down the other and then through the glass bridge to the second bent tube arrangement and so forth. One problem with such an arrangement is that the respective tube portions, when arranged symmetrically about the outer periphery of a circular cap portion, have their back portions all facing each other. With the back portions facing each other in this manner, the light output generated at such back portions reflects off of the other tubes many times resulting in some light lost through absorption.

In an alternate configuration, a single tube can be bent into a U-shape and then bent again in the middle. Other alternate lamp shape arrangements can be provided such as a simple

2 coil mounted horizontally relative to the base and its two legs extending into the base for electrical connection, and, a design wherein the top end of a coiled configuration extends back down through the center of the coil for electrical connection in the base. Such alternate lamp envelope designs can be found in U.S. Pat. Nos. 2,279,635; 3,764,844; and, 5,243,256. With each such alternate lamp envelope design, of ultimate consideration is the fact that such lamp envelope must be fabricated in a manufacturing system and as such, the design must be practical from a cost effectiveness point of view. Accordingly, it would be advantageous to provide a compact fluorescent lamp that could allow for higher lumen output configurations in a lamp envelope configuration that was efficient in terms of allowing light output with minimum absorption and could be implemented on automated high speed manufacturing equipment at a reasonable cost.

One way to form a compact fluorescent lamp having a coiled lamp envelope is to take a straight piece of glass tubing and coil it in the form of a simple coil. An example of such a coiled lamp envelope for a compact fluorescent lamp can be found in German Patent Application No. DE 4133077 filed in Germany on Oct. 2, 1991 and assigned to Narva Berliner Gluhlampenwerk GmbH. In this application, a simple coil arrangement is provided whereby the glass tubing is double wound with an interconnecting bridge portion formed at the top area connecting the two wound coil portions. In this arrangement, the overall lamp envelope configuration provides a side profile that is essentially straight up and down, there being a parallel relation between the tube segments that form the side wall area of the lamp envelope. Additionally, the top portion is essentially flat and, by virtue of the bridge portion formed between the two wound segments, only covers a portion of the area of the top of the lamp envelope, there being significant gaps at which no light output is generated. Finally, for the bottom portion of the lamp envelope, this reference shows such bottom portion residing on the lamp axis and being formed by bending such bottom portion at an angle away from the coil pitch.

Although a coiled coil configuration requires special manufacturing operations to produce, with a coiled envelope configuration, it can be appreciated that an efficiency improvement is achieved over that of a conventional compact fluorescent lamp, such efficiency coming as a result of the fact that only two legs of the envelope extend into the lamp base and thus less light is lost into the base as can occur for each of the multiple legs of the U-shaped configuration. Additionally, a coil configuration is the most compact structure for any given length and diameter of narrow tubing since height and diameter are continuously variable so as to allow for the different wattage lamps.

For the previously referenced German Patent Application, though the overall effect of the use of a coil configuration for the lamp envelope as shown is to achieve greater efficiency as compared to a compact fluorescent lamp that utilizes a U-shaped envelope, there are deficiencies in this coil design in terms of the ability to generate a light output that is distributed over an area similar to that of a conventional A-line incandescent lamp. In other words, this configuration only generates light output at the surface area of a coil configuration that is limited in terms of its shape which is straight up and down and has significant open spaces at its top portion. With this shape, there is a limitation that will show up in the form of a light distribution which is limited in certain directions. Accordingly, it would be advantageous if a compact fluorescent lamp could be provided with a

3 coiled lamp envelope configuration that approximates the shape of a conventional A-line incandescent lamp such that the light output distributed therefrom would be directed over a more uniform area than is presently achieved.

SUMMARY OF THE INVENTION

The present invention provides a compact fluorescent lamp with a coiled lamp envelope having an essentially hemispherical shape so that light distribution therefrom more closely resembles that of a conventional A-line incandescent lamp. Additionally, the present invention provides such a compact fluorescent lamp, which by use of the coiled lamp envelope configuration, allows for a discharge length that enables achieving higher lumen outputs than a typical compact fluorescent lamp, in fact, such a lumen output as corresponds to a 100 Watt incandescent lamp.

In accordance with the principles of the present invention, there is provided a low pressure discharge lamp which includes a lamp envelope having a phosphor coating disposed on the interior surface thereof and further, contains a gas fill of mercury and a noble gas. The lamp envelope is mounted on a housing assembly in which a ballast circuit arrangement can be disposed within a hollow cavity portion thereof. The lamp envelope is formed of tubular glass which is coiled in a manner so as to have a generally hemispherical outer profile. For example, the lamp envelope can be formed in the shape of a double helix.

In another embodiment of the invention, the lamp envelope is formed so as to have a top portion which is tapered inward and which includes a tubular portion that substantially covers the top portion of the lamp envelope so that the light output therefrom more closely resembles the light output from a conventional A-line lamp.

BRIEF DESCRIPTION OF THE DRAWINGS

In the following detailed description, reference will be made to the drawings in which.

DETAILED DESCRIPTION OF THE INVENTION

Figure 1:
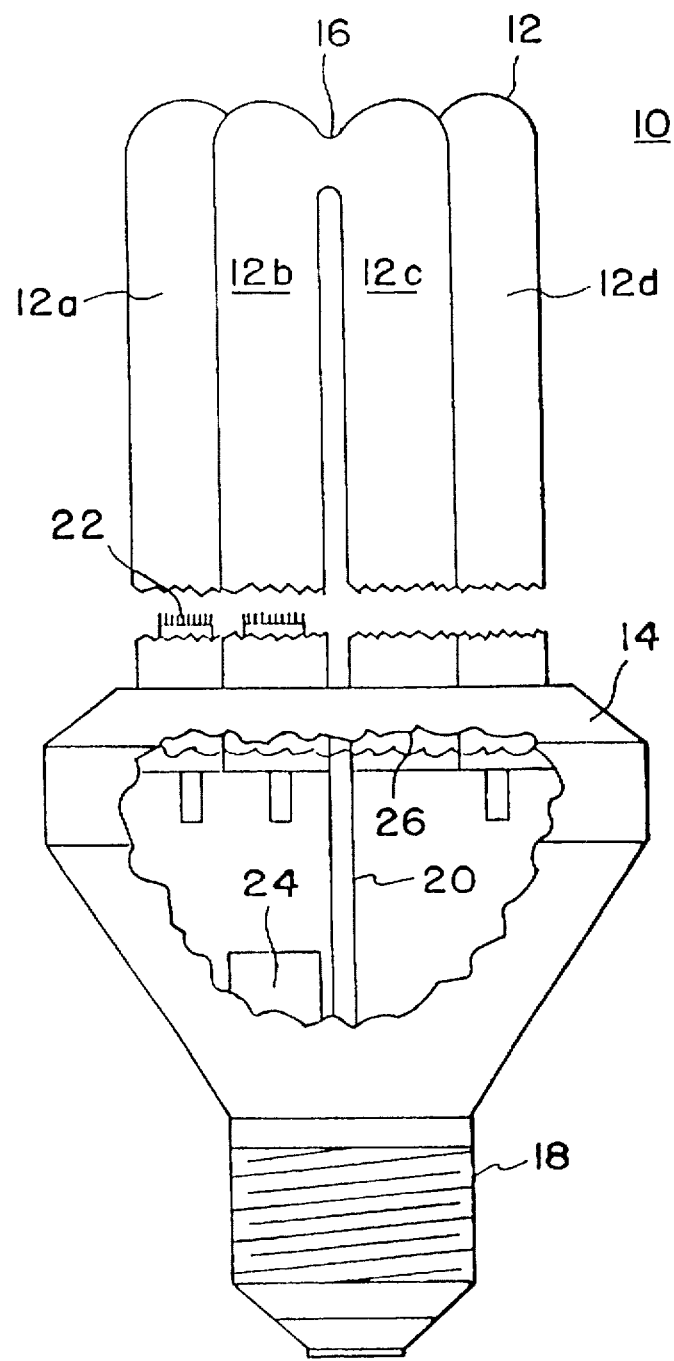
FIG. 1 is an elevational view in section of a compact fluorescent lamp constructed in accordance with the prior art.

As seen in FIG. 1, a compact fluorescent lamp 10 constructed in accordance with the teachings of the prior art, includes a lamp envelope configuration 12 with a plurality of extension tubes 12a, 12b, 12c and 12d, each of which extend upward from a housing 14 in a parallel manner to one another. Though illustrated as including four extension tubes, the lamp envelope configuration 12 of FIG. 1 can include either six or eight such extension tubes each of which would be disposed along the outer periphery of the top portion of the housing 14. In conventional practice, the extension tubes 12a, 12b, 12c and 12d are joined together in pairs and are essentially U-shaped with a junction 16 formed at the top of each pair. Additionally, a bridge connection (not shown) is formed at the bottom portion of each pair of extension tubes so as to connect the plurality of extension tubes in a continuous discharge path. A threaded screw base 18 is mounted on the bottom portion of the housing 14 to allow for use of the compact fluorescent lamp 10 in conventional light sockets (not shown). Also illustrated in FIG. 1 is a ballast circuit arrangement 20 which is mounted within the housing 14 and which is effective for receiving line power through the screw base 18 and converting the line power into an operating signal which is connected to electrodes 22 for driving the discharge. The discharge occurs within the lamp envelope 12 in a standard manner whereby a fill of mercury and a noble gas is excited to a discharge state by introduction of the operating signal generated by the ballast circuit arrangement 20. A phosphor coating (not shown) disposed on the inner surface of the lamp envelope is effective for converting the discharge into visible light as is well known in the art.

It should be noted that in order to achieve the higher lumen output configurations similar to those of conventional incandescent lamps that the compact fluorescent lamp is intended to replace, it is necessary to increase the discharge path within the lamp envelope to a length of greater than approximately 60 cm. By use of the parallel extension tubes 12a, 12b, 12c, and 12d (and as many as eight) of the prior art, there is a decrease in efficiency in that a greater number of extension tube end portions are disposed within the top portion of the housing 14 and therefore the light generated thereby is lost. Additionally, since there is a limit to the length of each extension tube as dictated by the size of the lighting fixtures in which the compact fluorescent lamp is intended for use, it is necessary to provide a larger number of extension tubes around the outer periphery of the top portion of the housing member 14. By crowding more extension tubes around the outer periphery of the top portion of the housing member 14, it can be appreciated that, with respect to light generated at the back portions of each extension tube, such light must bounce off of the backs of other extension tubes and a significant amount of light is thereby lost. In other words, only light generated at the outwardly facing portions of the extension tubes is distributed without reflecting off of numerous other surfaces as is the case of light generated on the back sides of each of such extension tubes.

It should be further noted that by placing more extension tubes along the outer periphery of the top portion of the housing member 14, a greater space is created at the top portion of the lamp envelope 12, a space in which there is no light output provided. If one were to utilize the compact fluorescent lamp 10 of the prior art in a lighting fixture designed for downlighting or for a reading light application, it is important to have light radiating from the top of the lamp similar to the manner of a conventional A-line incandescent lamp. The dead space of the lamp 10 also suffers from the disadvantage of experiencing the phenomenon of "flash" which can occur in a deep specularly reflecting light fixture where the "flash" is a term defining the observation of the reflection of the lamp in the fixture when one is looking at the ceiling. Flash is objectionable if the lamp image changes rapidly from light to dark as one walks under the lamp thereby drawing attention to the light source.

Figure 2:
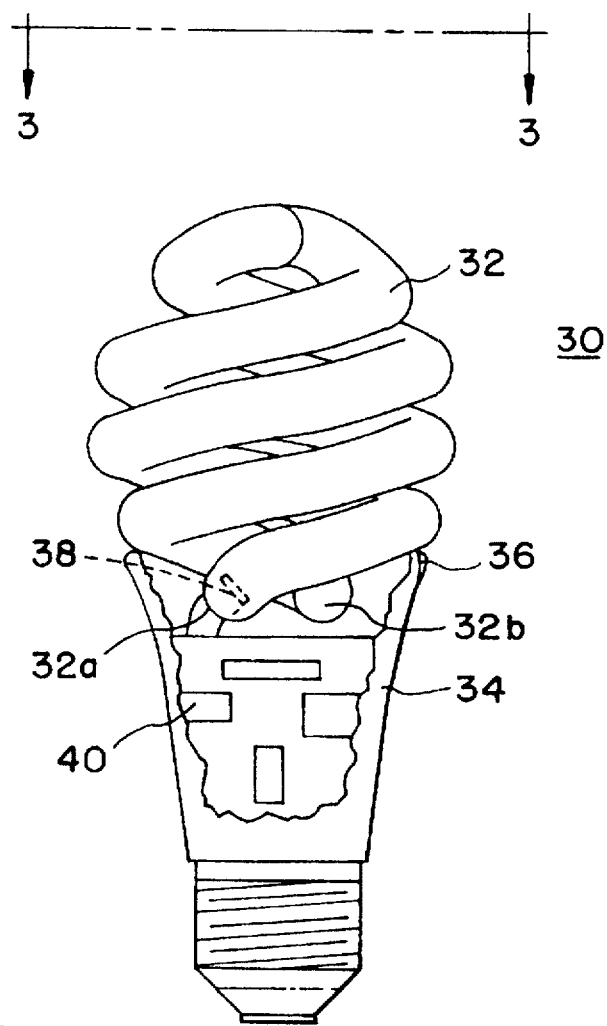
FIG. 2 is an elevational view in section of a compact fluorescent lamp constructed in accordance with the present invention.

The problems of the conventional compact fluorescent lamp 10 of the prior art are largely avoided by use of the coiled lamp envelope configuration 32 shown in FIG. 2 for the compact fluorescent lamp 30 constructed in accordance with the present invention. Lamp envelope 32 is constructed in a double helix configuration. Such a configuration can be described as a coil which starts at one end, wraps around the central axis going up and then at the top, crosses the coil and starts back down 180 degrees offset relative to the first coil. In this manner, coil segments running upward are interspersed with coil segments that are running downward and as such, allows for an open coil structure. In other words, by the double helix configuration, there are spaces provided between the coil lamp envelope segments. The benefit of such spaces is that light which is generated on the inside of the coiled lamp envelope 32, can more easily get out from this inside region without reflecting many times off of other tube or passing through other tubes where some light is lost through absorption as may occur for a straight lamp envelope configuration such as the U-shaped arrangement of the prior art.

A further advantage to the coiled lamp envelope 32 as shown in FIG. 2 is that there are no sharp corners or bridges which tend to be made of glass that is thinner than the glass of the main tube portions as is the case of the U-shaped lamps of the prior art. By the continuous coil arrangement of lamp envelope 32, a more robust lamp is provided that is not as fragile as previous compact fluorescent lamp envelopes. Yet another advantage of the coiled lamp envelope arrangement is the fact that the overall height of the lamp is minimized such that the present invention could be installed in a light fixture that was designed for an incandescent lamp of an A-19 size. A prior art compact fluorescent lamp with the U-shaped tube arrangement would extend beyond the rim of such a fixture and therefore be unacceptable.

The coiled lamp envelope 32 of FIG. 2, when viewed from the straight on position of this figure, exhibits an outer profile that is hemispherical in shape; that is, the sides are not straight but instead, are tapered in a way to more closely approximate the shape of a conventional incandescent lamp that the present invention is intended to replace. In this manner, it can be appreciated that the light distribution from the lamp envelope 32 will be more uniform than that of the conventional compact fluorescent lamp having the straight up and down U-shaped lamp envelope.

By the double helix configuration of lamp envelope 32, a further advantage occurs with respect to the end segments 32a and 32b whereby such end segments 32a and 32b enter the top portion 36 of the housing member at the angle that the coiled lamp envelope 32 is formed and from the outer surface area of the lamp envelope 32 rather than through the center as would be required for a single helical coil arrangement. Such an outward originating end segment 32a arrangement can be accomplished with such end segments being formed at the same angle of the pitch of the helix or at an inwardly extending angle as shown in FIG. 2. Moreover, by such an angled entry arrangement, less of the area of the end portions 32a and 32b is disposed within the top portion 36 of the housing where light is lost and, the respective end portions 32a and 32b are separated from one another thereby achieving an advantage in terms of thermal management.

Disposed within the end portions 32a and 32b of lamp envelope 32 are electrodes 38 which are electrically coupled to a ballast circuit arrangement 40 mounted within housing member 34. Ballast circuit arrangement 40 is effective for taking line power received over the threaded screw base and converting such line power into an appropriate signal for driving the compact fluorescent lamp 30 to a discharge state. For a detailed discussion of the operation of the ballast circuit arrangement 40, reference is hereby made to U.S. Pat. No. 5,341,068 issued to Nerone on Aug. 23, 1994, assigned to the same assignee as the present invention and herein incorporated by reference.

Figure 3:
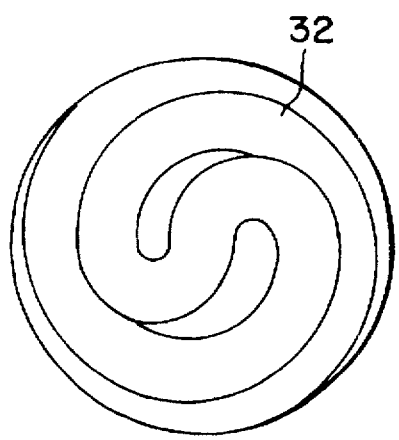
FIG. 3 is an elevational view of a portion of the lamp envelope taken along lines 3—3 of FIG. 2.

Illustrated in FIG. 3 is a top view of the lamp envelope 32 wherein the inwardly tapering configuration of the top of such lamp envelope 32 can be clearly seen. In addition to the fact that the inward tapering configuration more closely resembles the shape of an incandescent lamp, it can be seen that more of the top area of the lamp envelope 32 is covered by coil segments of the lamp envelope thereby reducing the space for which there is no light output. With this configuration, there is more light radiated from the top of the lamp which is important for lighting applications where there is a need for downlighting such as in a recessed lighting fixture or in a reading lamp situation. Such an inwardly tapering arrangement is also effective for substantially reducing the problem of "flash" which, as previously discussed, is the situation where the appearance of the lamp changes rapidly from light to dark as one walks under the light source. By filling in the top of the lamp, the reflection of the source will appear bright when it is first seen but it will not change dramatically as the top of the lamp comes into focus and will remain bright until it can no longer be seen. Of course, in addition to the functional advantages of the inwardly tapering top portion of lamp envelope 32, there is the further advantage that such a configuration is more aesthetically pleasing than the conventional compact fluorescent lamps which utilize the U-shaped lamp envelope.

In order to fabricate the coiled lamp envelope 32 for the compact fluorescent lamp 30 of the present invention, it is possible to use a mandrel (not shown). Any of the helical designs of lamp envelopes contemplated by this invention can be formed on a simple helical mandrel which could be a straight rod into which is cut a helical groove. It would also be possible to form the helical lamp envelope inside of a cupped mold having the helical grooves formed on the inside of the mold. The helical groove would be cut to the depth of the inner diameter of the coil. It will be noted that for any such tool, the top portion must taper inward so as to allow for the formation of the inwardly tapering top portion of the lamp envelope 32. A slot could be formed at the apex of the mandrel so as to allow for the crossover of the glass tubing from the upward coiling direction to the downward coiling direction. To form the double helix of the coiled lamp envelope 32, straight glass tubing is heated to its softening or working range and centered on the tool (not shown) and either the tool turns and moves linearly along the axis coiling the softened tubing or alternatively, the tubing can be moved or wrapped around the tool. In preparing a mandrel for use so as to fabricate a lamp envelope that is hemispherical in its outer side profile, it is proposed that a collapsible mandrel could be utilized. Such a collapsible mandrel would allow for removal of the lamp envelope 32 after setting, by unscrewing the collapsed mandrel through the smaller diameter opening at the bottom of the lamp envelope near the end portions 32a and 32b.

Figure 4:
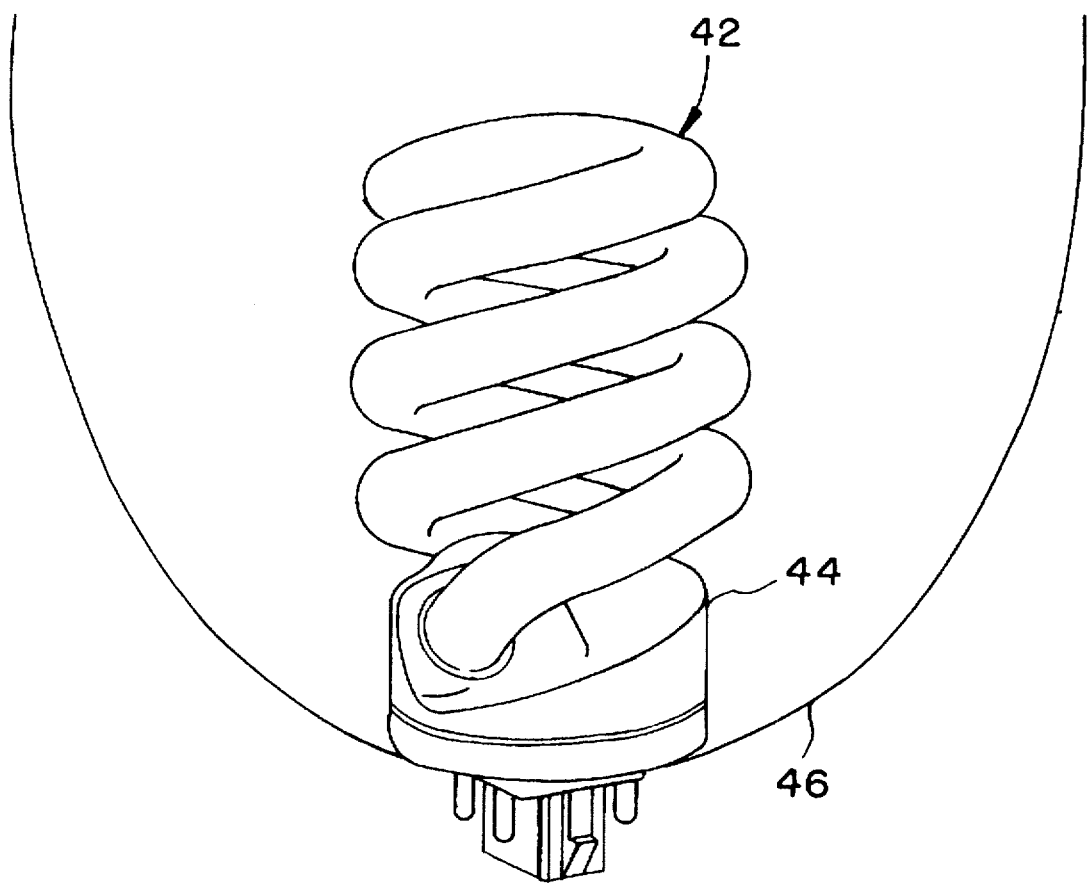
FIG. 4 is an elevational view in section of an alternate configuration of a lamp envelope constructed in accordance with the present invention.

As seen in FIG. 4, an alternate embodiment of the lamp envelope 42 is provided having the side profile which is essentially straight yet wherein the top portion of the lamp envelope forms a hemispherical shape. It should also be noted that as to the number of turns that make up the double helix of either lamp envelope 32 or 42, such number can be varied so as to achieve different wattage and hence lumen output, configurations. Additionally, it will be noted that lamp envelope 42 is shown with a plug configuration 44 and mounted within a reflector or other type of fixture 46. The lamp envelope 32 or 42 presented herein achieves significant advantages over prior art compact fluorescent lamps in that there is more direct light radiated from the hemispherical top portion as well as more light which is indirectly radiated or reflected, from the lower portion.

Although the hereinabove described embodiment constitutes the preferred embodiment of the invention, it should be understood that modifications can be made thereto without departing from the scope of the invention. For instance, instead of a straight or a hemispherically shaped side profile of the lamp envelope 32, the lamp envelope can be formed with an inwardly tapering lower portion such that the shape resembles that of a cone. Additionally, though shown in the form of an integral lamp and ballast configuration, the present invention can be practiced by use of a separable lamp and plug arrangement wherein the lamp envelope would be mounted on an adaptor post with pins extending therefrom. Yet another embodiment would be the substitution of a phosphor coating and gas fill with some other luminescent material or in fact, providing a colored discharge by use of neon.

What is claimed as new is:

1. A low pressure discharge lamp comprising:

a lamp envelope having an interior surface with a phosphor coating disposed thereon, and containing a gas fill energizeable to a discharge state;

a housing member on which said lamp envelope is mounted; and wherein said lamp envelope is formed of tubular material and is shaped essentially in the form of a double helix, said double helix having an apex and having a widest portion defining a perimeter boundary, said double helix having a top crossover segment from which depend a first downwardly spiraling segment and a second downwardly spiraling segment, in a top view of said lamp envelope said top crossover segment having a substantially straight portion at the apex defining a neutral axis, each of said first and second downwardly spiraling segments rotating more than 180° from said neutral axis before reaching said perimeter boundary.

2. A discharge lamp as set forth in claim 1 wherein said lamp envelope has a top portion which is shaped in an inwardly tapering manner, said top portion being effective to provide a light output distribution at said top portion that is substantially uniform across said top portion.

3. A discharge lamp as set forth in claim 1 wherein end portions of said lamp envelope extend into a top cap portion of said housing member at an angle so as to minimize the amount of lamp envelope surface area covered by said top cap portion of said housing member.

4. A discharge lamp as set forth in claim 3 wherein said end portions of said lamp envelope extend into said housing member from points along the outer periphery of said top cap portion.

5. A discharge lamp according to claim 1, each of said first and second downwardly spiraling segments rotating more than 360° from said neutral axis before reaching said perimeter boundary.

6. A discharge lamp according to claim 5, each of said first and second downwardly spiraling segments rotating about 400° from said neutral axis before reaching said perimeter boundary.

7. A low pressure discharge lamp according to claim 1, further comprising a ballast circuit arrangement disposed within said housing member and effective so as to energize said gas fill to such discharge state.

8. A discharge lamp as set forth in claim 7 wherein end portions of said lamp envelope extend into a top cap portion of said housing member at an angle so as to minimize the amount of lamp envelope surface area covered by said top cap portion of said housing member.

9. A low pressure discharge lamp comprising:

a lamp envelope containing a gas fill energizeable to a discharge state;

a housing member on which said lamp envelope is mounted;

circuit means, disposed in said housing member, for driving said gas fill to such discharge state; and, wherein said lamp envelope is formed of a tubular material, is shaped essentially in the form of a double helix, is comprised of tube portions, and has a hollow space formed within a center portion thereof, said double helix having an apex and having a widest portion defining a perimeter boundary, said double helix having a top crossover segment from which depend a first downwardly spiraling segment and a second downwardly spiraling segment, in a top view of said lamp envelope said top crossover segment having a substantially straight portion at the apex defining a neutral axis, each of said first and second downwardly spiraling segments rotating more than 180° from said neutral axis before reaching said perimeter boundary.

10. A discharge lamp as set forth in claim 9 wherein said lamp envelope includes side portions which are spaced apart relative to one another for a predetermined spacing; said predetermined spacing, by virtue of said double helix shape of said lamp envelope, being effective so as to allow light output generated from back surfaces of tube portions located across said hollow space to be distributed therethrough.

11. A discharge lamp as set forth in claim 9 wherein said lamp envelope has a top portion which is shaped in an inwardly tapering manner, said top portion being effective to provide a light output distribution at said top portion that is substantially uniform across said top portion.

12. A low pressure discharge lamp comprising:

a lamp envelope having an interior surface with a phosphor coating disposed thereon, and containing a gas fill energizeable to a discharge state;

a housing member on which said lamp envelope is mounted; and wherein said lamp envelope is formed of tubular material and is shaped essentially in the form of a double helix, said double helix-shaped envelope being configured to form (1) a hemispherical top portion having an imaginary hemispherical first surface area and (2) a cylindrical bottom portion having an imaginary cylindrical second surface area, said first surface area being about equal to a surface area which is not less than the surface area of said second surface area.

13. A low pressure discharge lamp according to claim 12, said tubular material having an outer diameter defining a tube width, said double helix having a widest portion defining a perimeter boundary and a double helix width, said double helix width being at least five times said tube width.

* * * * *